United States Patent [19]

Madock

[11] Patent Number: 5,645,329
[45] Date of Patent: Jul. 8, 1997

[54] MODULAR COMPACT DISC CASE HOLDER WITH DISC CASE EJECTION MECHANISM

[76] Inventor: Michael F. Madock, 7616 Division, River Forest, Ill. 60305

[21] Appl. No.: 576,021

[22] Filed: Dec. 21, 1995

[51] Int. Cl.$^6$ .................................................. A47B 81/06
[52] U.S. Cl. ...................... 312/9.63; 312/9.11; 312/9.17; 312/9.19; 312/9.47; 312/257.1; 206/368.1; 220/4.28
[58] Field of Search ........................ 312/9.19, 9.63, 312/9.11, 9.16, 9.17, 9.21, 9.47, 9.53, 9.54, 9.55, 9.57, 107, 108, 111, 265.4, 265.5, 265.6, 257.1; 206/308.1, 309; 220/4.28, 507

[56] References Cited

U.S. PATENT DOCUMENTS

| | | | |
|---|---|---|---|
| 1,033,014 | 7/1912 | Holstein | 312/9.17 |
| 1,219,975 | 3/1917 | McVay | 312/9.11 |
| 1,379,030 | 5/1921 | McDougall et al. | 312/9.19 |
| 2,402,076 | 6/1946 | Painter | 312/9.19 |
| 3,779,621 | 12/1973 | Carless | 312/9.17 |
| 3,851,936 | 12/1974 | Muller | 312/245 X |
| 3,856,369 | 12/1974 | Commiant | 312/107 |
| 3,969,007 | 7/1976 | Lowry | 312/9.21 |
| 4,423,913 | 1/1984 | Lee | 312/107 |
| 4,655,345 | 4/1987 | Drake et al. | 206/308.1 |
| 4,678,245 | 7/1987 | Fouassier | 312/257.1 X |
| 5,186,527 | 2/1993 | Lockhardt | 312/9.47 |
| 5,320,244 | 6/1994 | Yu | 206/308.1 X |
| 5,458,238 | 10/1995 | Dominguez-Gutierrez | 220/4.28 X |
| 5,509,731 | 4/1996 | Callahan et al. | 312/9.63 X |

FOREIGN PATENT DOCUMENTS

| | | | |
|---|---|---|---|
| 1129780 | 8/1982 | Canada | 312/9.16 |
| 699071 | 2/1931 | France | 312/9.19 |
| 6090089 | 3/1994 | Japan | 312/257.1 |

*Primary Examiner*—Peter M. Cuomo
*Assistant Examiner*—Rodney B. White
*Attorney, Agent, or Firm*—McAndrews, Held & Malloy, Ltd.

[57] ABSTRACT

A modular compact disc case holder includes a mechanism that is manually actuable by a user for ejecting a compact disc case from the holder upon user selection thereof. The compact disc case holder includes a bottom wall having a number of upstanding ribs spaced along a width thereof so as to define a number of compact disc case holding areas. The bottom wall includes in each of the compact disc holding areas a spring and a retaining member for maintaining a compact disc case between the spring and a retaining member when the retaining member is in a first position. The retaining member is movable by a user to a second position for releasing a compact disc case to allow the spring to partially eject the case from the holder so than it may be easily grasped by a user's fingers. The holder also includes first and second side walls each of which is mountable on a respective first and second side of the bottom wall. A top wall is mountable on the first and second side walls wherein the top wall includes a number of downwardly extending ribs that are spaced in alignment with the bottom wall ribs so as to further define the compact disc case holding areas.

19 Claims, 5 Drawing Sheets

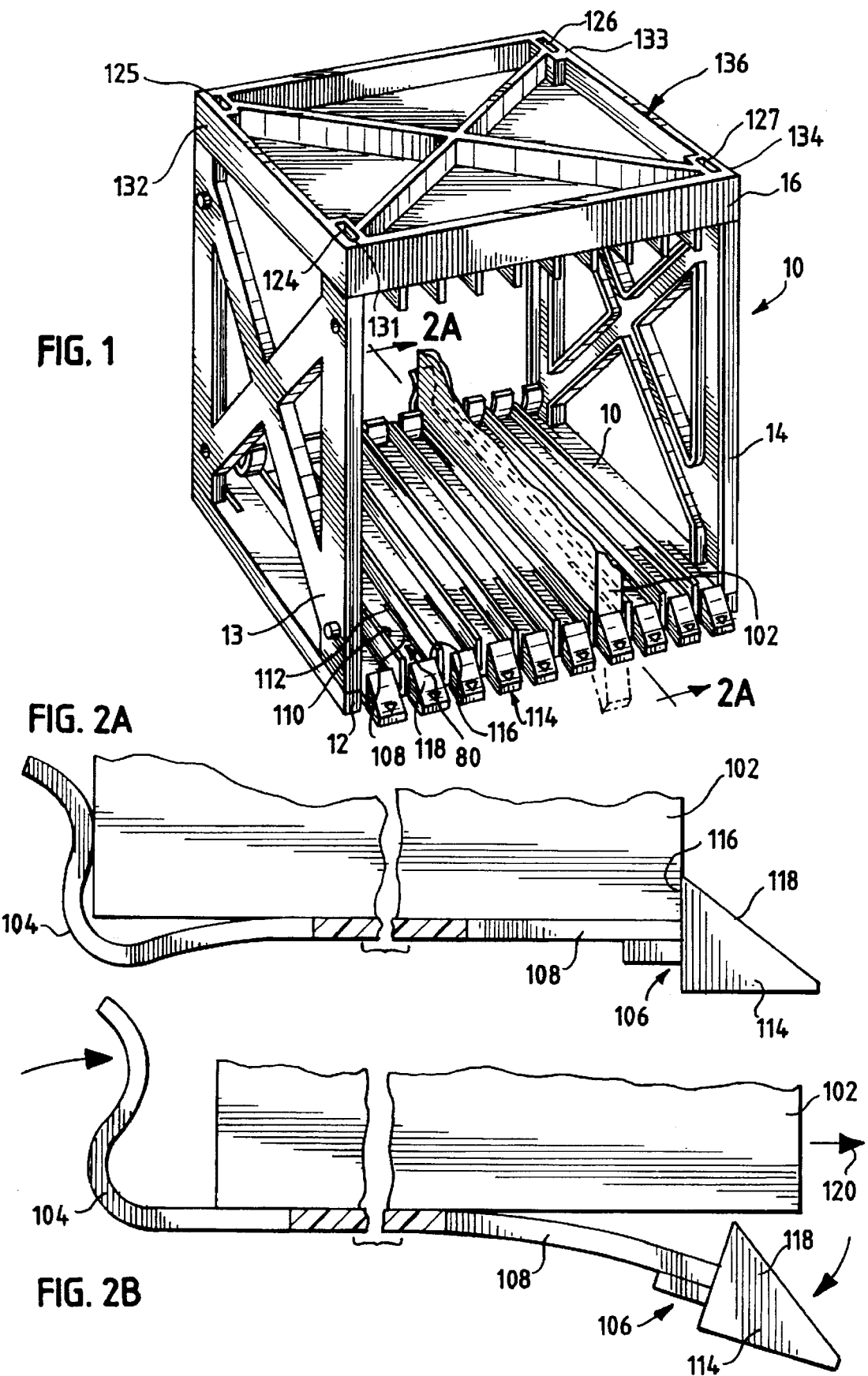

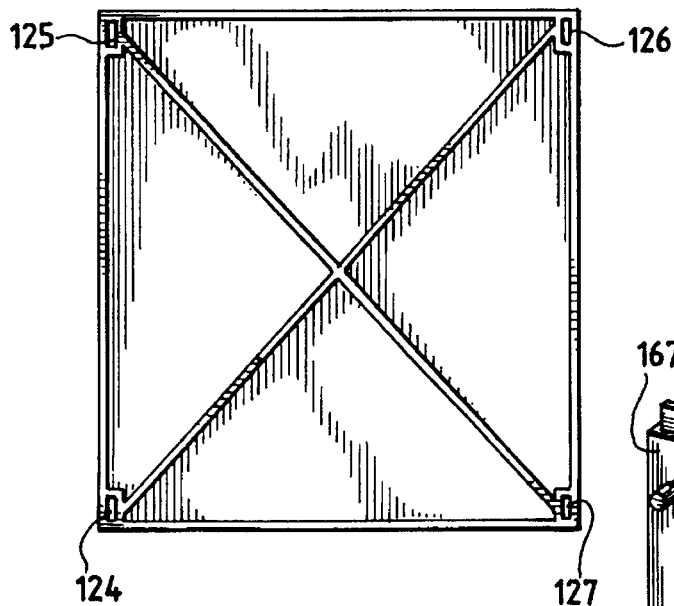
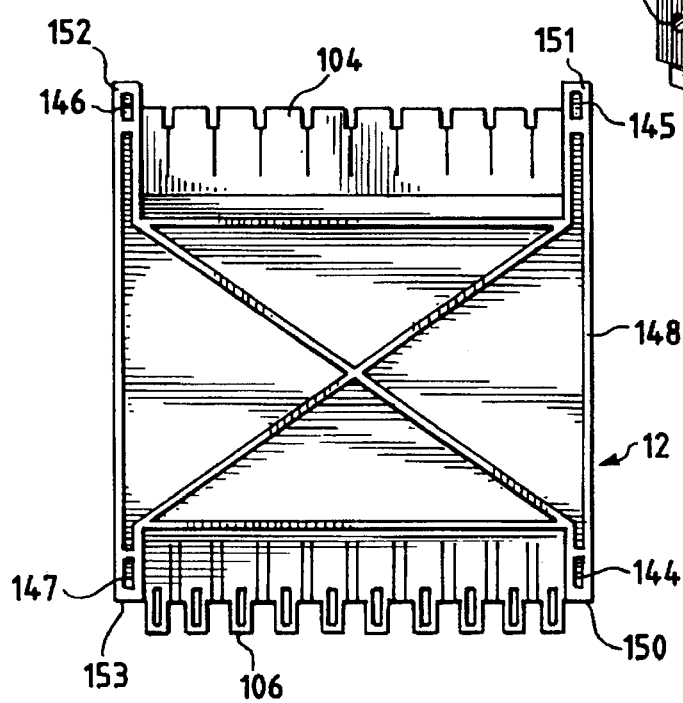
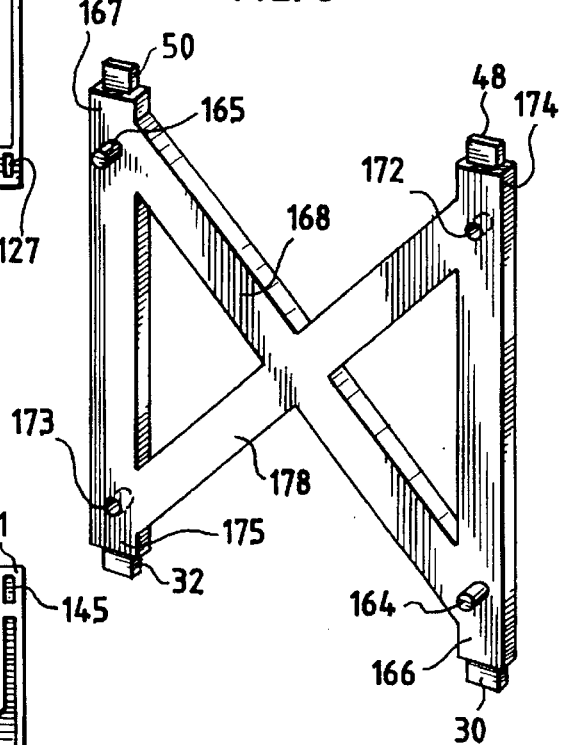

MODULAR COMPACT DISC CASE HOLDER WITH DISC CASE EJECTION MECHANISM

FIELD OF INVENTION

The present invention relates to a compact disc case holder and more particularly to a modular compact disc case holder with a mechanism for ejecting a compact disc case from the holder upon a user's selection thereof.

BACKGROUND OF THE INVENTION

Holders are known for storing a number of compact disc cases. These holders are typically formed as a square box with individual slots therein, each slot storing one compact disc case. It can be very difficult to remove a compact disc case from such a holder since each of the slots for one case is narrow, typically with very little clearance between the disc case and slot dividers to allow a person's fingers to grasp a disc case. Often a person has to tip the holder to cause the disc cases held therein to slide out far enough to be grasped. However, when this is done, it is difficult to maintain all but the desired disc case in the holder.

SUMMARY OF THE INVENTION

In accordance with the present invention, the disadvantages of prior compact disc case holders have been overcome. The compact disc case holder of the present invention is modular and includes a mechanism that is manually actuable by a user for ejecting a compact disc from the holder upon user selection thereof.

More particularly, the compact disc case holder of the present invention includes a bottom wall having a number of upstanding ribs that are spaced along a width of the bottom wall and that define a number of compact disc case holding areas. The bottom wall includes in each of the compact disc case holding areas a spring and a retaining member for maintaining a compact disc case between the spring and the retaining member when the retaining member is in a first position. The retaining member is movable by a user to a second position for releasing a compact disc case to allow the spring to partially eject the case from the holder so that it may be easily grasped by a user. The holder also includes first and second side walls each of which is mountable on a respective first and second side of the bottom wall. A top wall is mountable on the first and second side walls wherein the top wall includes a number of downwardly extending ribs spaced along a width thereof which together with the upstanding ribs on the bottom wall define the compact disc case holding areas.

In one embodiment of the holder, the springs and retaining members of the bottom wall are integrally formed as a part thereof out of molded plastic. In another embodiment, the retaining member of the bottom wall is integrally formed as a part thereof from molded plastic; however metal springs are employed.

In a preferred embodiment, the top of the top wall of the compact disc case holder is formed with connecting members that mate with connecting members formed on the bottom of the bottom wall. This feature allows multiple holders to be connected, one on top of each other in a very stable configuration. Similarly, the side walls of the holder are formed with connecting members that mate with connecting members formed on the side walls of other compact disc case holders so that multiple holders can be connected, side by side as well. Thus, the modular compact disc case holders of the present invention can be assembled together to form a unit of any desired size and overall shape.

These and other advantages and novel features of the present invention, as well as details of an illustrated embodiment thereof, will be more fully understood from the following description and drawings.

BRIEF DESCRIPTION OF THE DRAWING

FIG. 1 is a front perspective view of a modular compact disc case holder in accordance with the present invention;

FIG. 2A is a partial side view of a compact disc case held between a spring and retaining member of the bottom wall of the holder of FIG. 1;

FIG. 2B is a side view illustrating the motion of the compact disc case shown in FIG. 2A as it is ejected by depressing the retaining member of the bottom wall of the holder;

FIG. 4 is a top view of the top wall of the holder of FIG. 1;

FIG. 5 is a bottom view of the bottom wall of the holder of FIG. 1;

FIG. 6 is a perspective view of a side wall of the holder of FIG. 1;

DESCRIPTION OF THE PREFERRED EMBODIMENT

Figure 3:
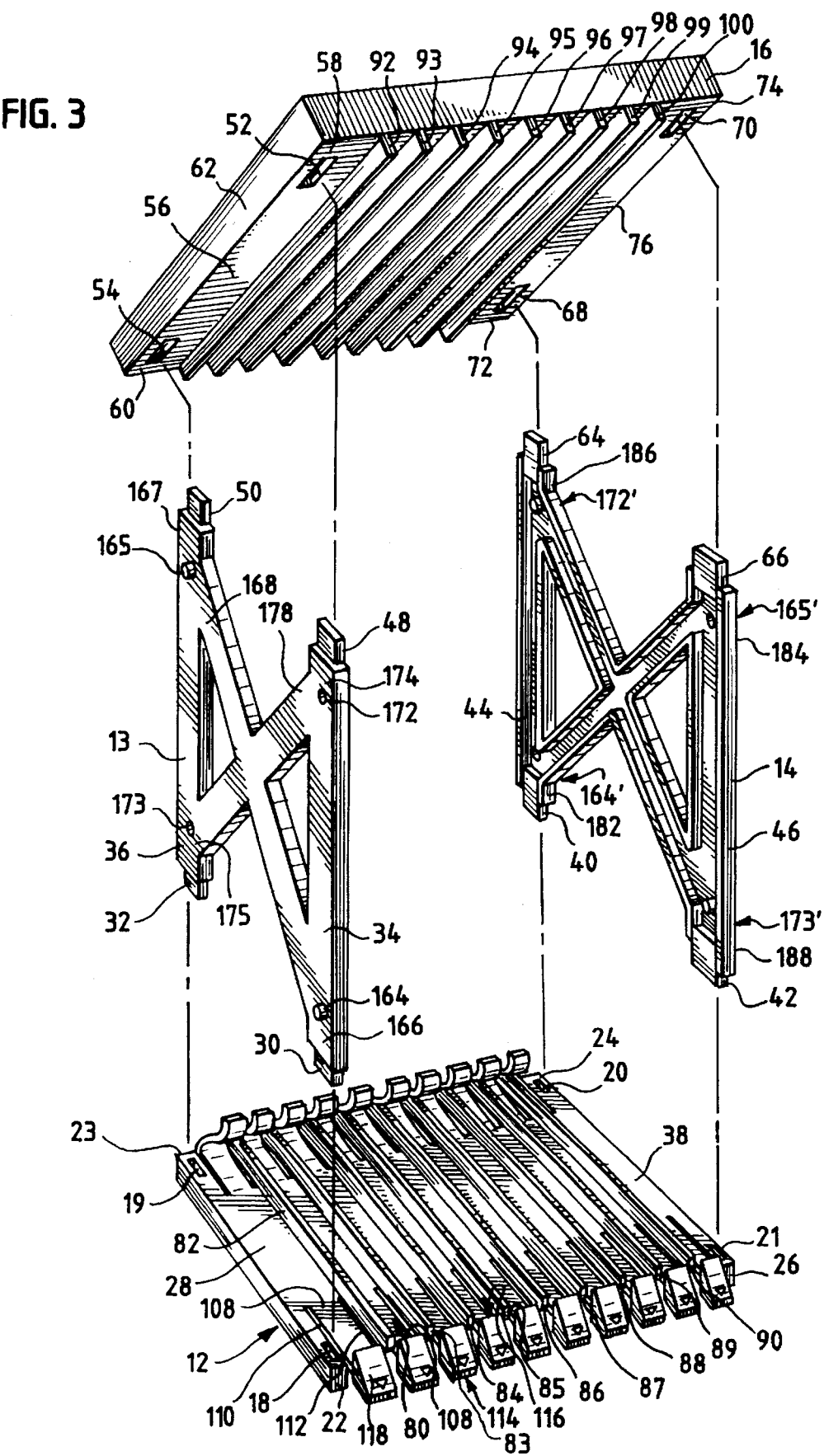
FIG. 3 is an exploded view of the compact disc case holder of FIG. 1 illustrating the four walls thereof.

A compact disc case holder 10 as shown in FIGS. 1–6 includes a bottom wall 12, side walls 13 and 14 and a top wall 16. The bottom wall 12 includes rectangular apertures 18–21 formed in respective corners 22–26 of the bottom wall 12. The apertures 18 and 19 on a first side 28 of the bottom wall 12 receive respective projections 30 and 32 that extend downwardly from the bottom of a pair of legs 34 and 36 of the side wall 13 so as to mount the side wall 13 on one side of the bottom wall 12. Similarly, the apertures 20 and 21 on a second side 38 of the bottom wall 12 receive respective projections 40 and 42 that extend downwardly from the bottom of a pair of legs 44 and 46 of the side wall 14 to mount the side wall 14 on an opposite side of the bottom wall 12. Projections 48 and 50 that extend upwardly from the top of the legs 34 and 36 of the side wall 13 are insertable into rectangular apertures 52 and 54 formed in the bottom 56 of the top wall 16 at respective corners 58 and 60 of the top wall on a first side 62 thereof. Similarly, projections 64 and 66 that extend upwardly from the top of the legs 44 and 46 of the side wall 14 are insertable into rectangular apertures 68 and 70 formed in the bottom 56 of the top wall 16 at respective corners 72 and 74 of the top wall on a second side 76 thereof. When the side walls 13 and 14 are thus mounted on the respective sides 28 and 38 of the bottom wall 12 and the top wall 16 is thus mounted on the side walls 13 and 14, a compact disc case holder 10 having a generally rectangular shape is thus formed.

Individual compact disc case holding areas, such as the area 80, are defined by a number of ribs 82–90 that project upwardly from the bottom wall 12 and by a number of ribs 92–100 that project downwardly from the top wall 16 in alignment with respective ones of the bottom wall ribs 82–90. Each of the ribs 82–90 extends along a substantial portion of the length of the bottom wall 12 wherein the ribs 82–90 are spaced along the width of the bottom wall 12 by a distance that is slightly greater than the standard width of a compact disc case 102. Similarly, each of the ribs 92–100 extends along a substantial portion of the length of the top wall 16 wherein the ribs 92–100 are spaced along the width of the top wall 16 by the same distance separating the bottom wall ribs 82–90. The ribs 82–90 and 92–100 form dividers to separate individual compact disc case holding areas 80 and to guide a compact disc case 102 as it is being ejected from the holder 10.

Each of the compact disc case holding areas 80 includes a respective S-curve spring 104 cantilevered in the holding area 80 and a retaining member 106. Each retaining member 106 includes a movable or deflectable cantilevered portion 108 that is formed between a pair of slots 110 and 112 in the bottom wall 12. Disposed at an outermost end of the cantilevered portion 108 is an actuator portion 114 that has an upstanding lip 116 for engaging a side of a compact disc case 102. The actuator portion 114 also has a downwardly and outwardly sloping actuator surface 118. The ribs 82 and 83, for example, that define a compact disc case holding area 80 preferably extend above the slots 110,112 between which the cantilevered portion 108 of the retaining member is formed with the ribs extending to the lip 116 of the actuator portion 114 so as to guide a compact disc case as it is being ejected from the holder 10 as discussed below.

As shown in FIG. 2A, when a compact disc case 102 is inserted into a compact disc case holding area 80 of the holder 10, the case 102 is held between the spring 104 and the retaining member 106 when the retaining member 106 is in a first, non-deflected position as shown. When a person selects a compact disc, he ejects the case 102 for the compact disc by pressing downwardly on the actuator surface 118 of a selected retaining member 106 to move the retaining member 106 to a second, deflected position as shown in FIG. 2B. In the deflected position, the retaining member 106 releases the case 102 from engagement thereby. Once the case 102 is released by the retaining member 106, the S-curve spring 104 exerts a force on the case 102 to move the case in the direction of the arrow 120 to partially eject the individual case 102 from the holder 10. The spring need only move the case 102 by a small amount to allow a sufficient portion of the case 102 to extend beyond the walls 12, 13, 14 and 16 of the holder 10 so that the case 102 can be easily grasped between a person's fingers.

Figure 8:
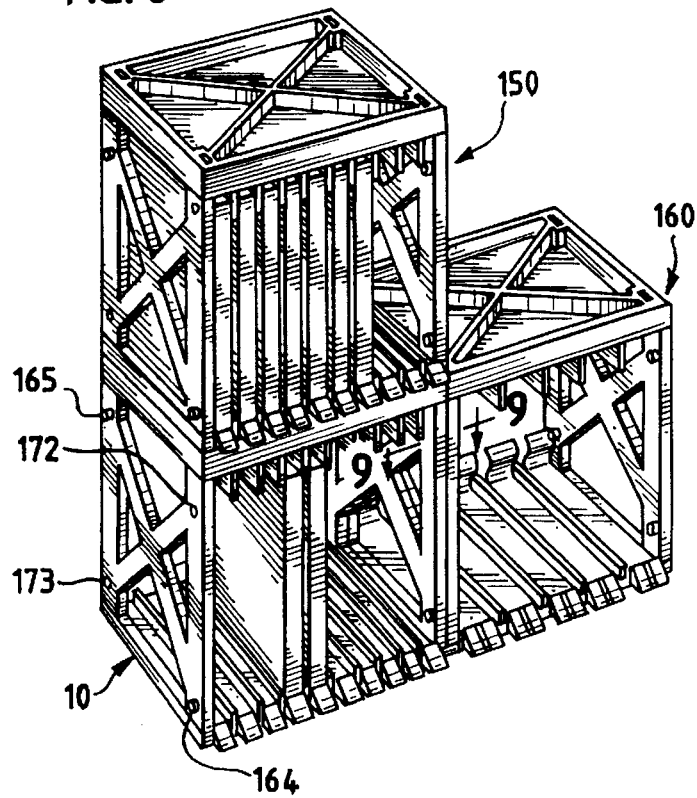
FIG. 8 is a perspective view of three compact disc case holders connected together so that one holder is on top of a second holder and a third holder is connected side by side to the second holder.
Figure 9:
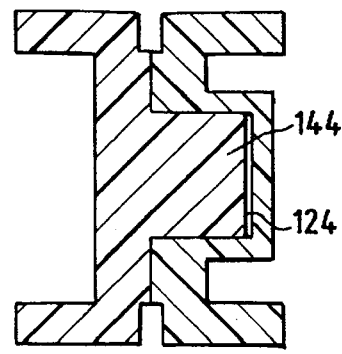
FIG. 9 is a cross sectional view of the connecting members of the top and bottom walls allowing a pair of holders to be connected one on top of another.

As shown in FIGS. 1 and 4, the top wall 16 is formed with apertures 124–127 in respective corners 131–134 of a top surface 136 thereof. These apertures 124–127 are connecting members that allow a top wall 16 of one holder 10 to be connected to corresponding connecting members formed on the bottom of a bottom wall 12' of a second holder 150 as shown in FIG. 8 to allow multiple holders 10, 150 to be connected one on top of each other. More particularly, the apertures 124–127 in the top surface 136 of the top wall 16 receive a respective, generally rectangularly shaped projection 144–147 that extends downwardly from a bottom surface 148 of the bottom wall 12 at the respective corners 150–153 thereof. When the projections 144–147 of the bottom wall 12 of a holder 150 are thus inserted into the respective apertures 124–127 of the top wall 16 of another holder 10, the two holders 10 and 150 are securely connected together so as to provide a sturdy compact disc holding unit.

Multiple compact disc holders 10 can also be connected to each other in a side by side relationship as shown for the holders 10 and 160 in FIG. 8. An outersurface 162 of the side wall 13 includes outwardly extending projections 164 and 165 formed respectively on a lower front corner 166 and an upper back corner 167 of the side wall 13 so as to be on a diagonal cross member 168 of the side wall. The side wall 13 also includes apertures 172 and 173 formed in a respective upper front corner 174 and lower back corner 175 on a diagonal cross member 178 of the side wall. Preferably, the side walls 13 and 14 are identical in configuration so that when the side wall 14 is mounted on the base 12, the projections 164' and 165' extend from a respective lower back corner 182 and upper front corner 184 and the apertures 172' and 175' are formed in a respective upper back corner 186 and a lower front corner 188. Thus, the projections 164' and 165' on the right side wall 14 of one holder 10 are mateable with the respective apertures 173 and 172 formed in the left side wall 13 of another holder 160. Similarly, the projections 164 and 165 on the left side wall 13 of the second holder 160 are mateable with the respective apertures 172' and 173' formed in the right side wall 14 of the holder 10. The connecting members formed by the apertures and projections on the respective side walls 13 and 14 of the holders allow multiple holders to be securely connected in a side by side relationship.

Figure 7:
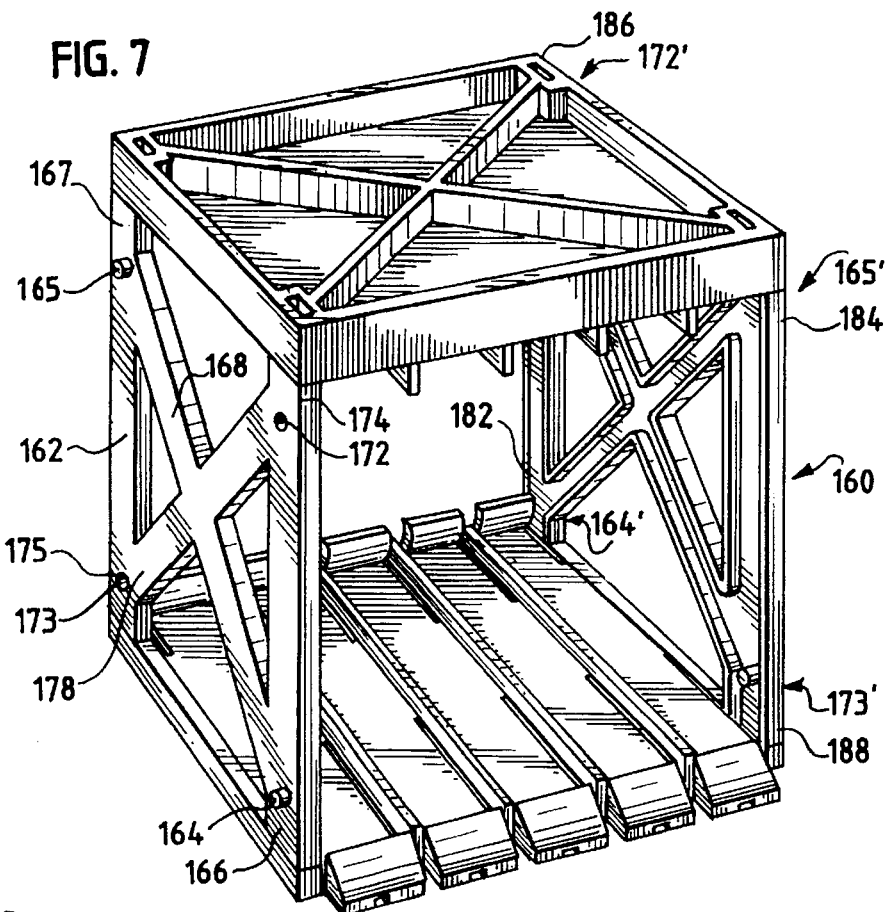
FIG. 7 is a perspective view of a compact disc case holder for holding double compact disc cases.

Each of the walls 12, 13, 14 and 16 of the holder 10 is preferably formed of molded plastic. Because the side walls 13 and 14 have the same configuration, they may be formed from the same mold thereby substantially reducing the cost of manufacturing the holder 10. The compact disc case holding areas 80 of a holder 10 may be the width of a single disc storing case 102 or they may be double the width to hold double disc storing cases as shown for the holder 160 in FIGS. 7 and 8. Further, both the springs 104 and retaining members 106 of the bottom wall 12 may be formed of molded plastic as an integral part of the bottom wall 12. Alternatively, only the retaining members 106 are formed as an integral part of the bottom wall 12 with separate springs 106 inserted into the bottom wall 12 for each of the compact disc case holding areas 80. This alternative embodiment of the present invention is shown in FIG. 10.

Figure 10:
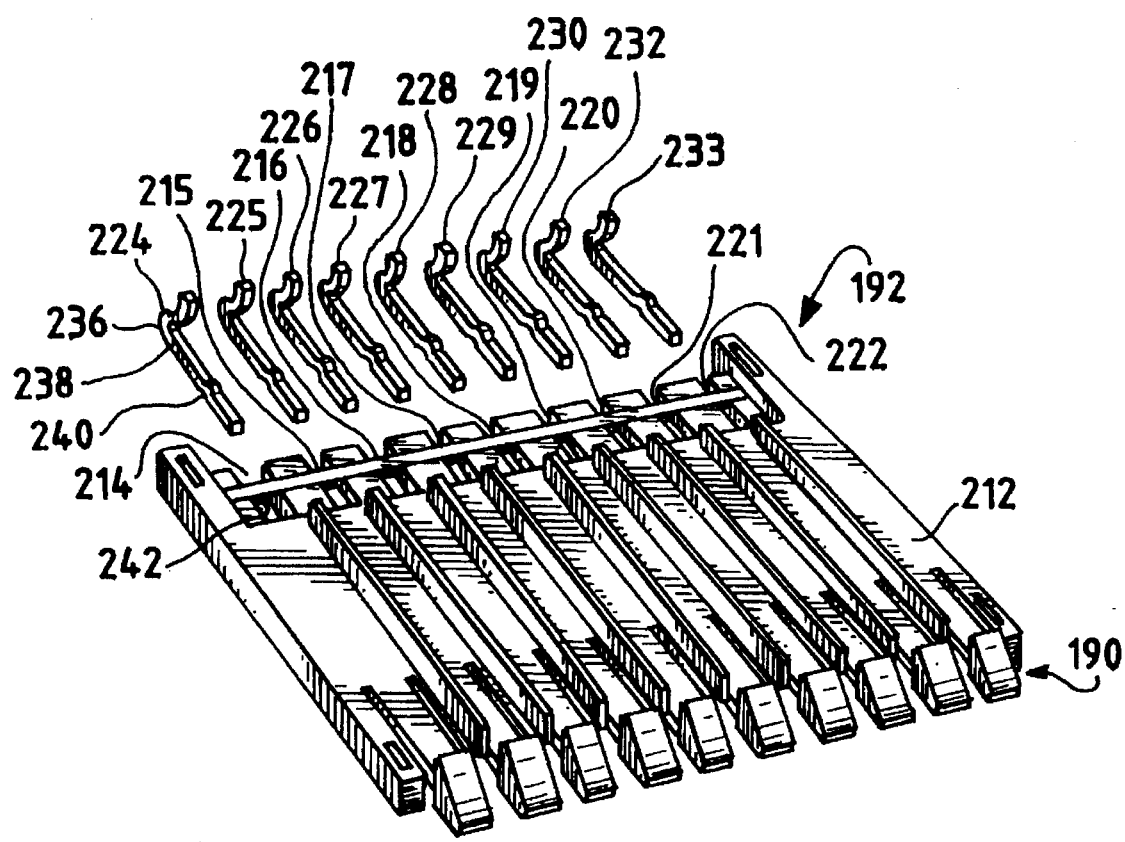
FIG. 10 is an illustration of a second embodiment of the bottom wall of the holder of the present invention utilizing separate springs.

As shown in FIG. 10, the front 190 of the bottom wall 212 is the same as that described above for the first embodiment of the bottom wall 12. However, the back 192 of the bottom wall 212 is formed with a number of slots 214–222 for receiving a respective spring 224–233. Each of the springs 224–233 may be formed of a plastic or preferably metal having an S-curved portion 236 and extending from a bottom of the S-curved portion an elongated portion 238 with a slight projection 240 adjacent an end thereof. The elongated portion 238 of each of the springs 224–233 is inserted into a respective slot 214–222 of the bottom wall 212 with the projection 240 of the spring engaging a stop member 242 in each of the slots 214–222 so as to maintain the spring securely in place in the slot of the bottom wall 212. Many other modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A modular holder for a plurality of compact discs each of which is stored in an associated case comprising:

a bottom wall having a plurality of upstanding ribs spaced along a width of said bottom wall and defining a plurality of compact disc case holding areas, said bottom wall including in each of said compact disc case holding areas a spring and a retaining member disposed opposite of said spring for opposing the force thereof to maintain a compact disc case between said spring and said retaining member when said retaining member is in a first position, said retaining member being movable to a second position for releasing a compact disc case to allow said spring to partially eject said case from said holder, wherein said retaining member is formed as an integral part of said bottom wall;

a first side wall mountable on a first side of said bottom wall;

a second side wall mountable on a second side of said bottom wall opposite said first side; and a top wall mountable on said first and second side walls.

2. A modular holder for a plurality of compact disc cases as recited in claim 1 wherein said spring is formed as an integral part of said bottom wall.

3. A modular holder for a plurality of compact disc cases as recited in claim 1 wherein said retaining member is formed as an integral part of said bottom wall of molded plastic and each of said springs is a metal spring mounted on said bottom wall.

4. A modular holder for a plurality of compact disc cases as recited in claim 1 wherein each of said retaining members includes a cantilevered portion that is spaced from an adjacent rib so as to be movable with respect thereto and at an outer end of said cantilevered portion, each of said retaining members includes an actuator portion that is manually actuable to move said cantilevered portion downwardly, said actuator portion having an upstanding lip to engage a compact disc case when said retaining member is in said first position, said lip disengaging a compact disc case when said actuator portion is moved to said second position.

5. A modular holder for a plurality of compact disc cases as recited in claim 1 wherein said top wall includes a plurality of downwardly extending ribs spaced along a width thereof to further define each of said plurality of compact disc case holding areas.

6. A modular holder for a plurality of compact disc cases as recited in claim 1 wherein a bottom wall of a first holder includes a plurality of connecting members mateable with a plurality of connecting members on a top wall of a second holder to allow the bottom wall of said first holder to be connected to the top wall of said second holder to mount said first holder on top of said second holder.

7. A modular holder for a plurality of compact disc cases as recited in claim 1 wherein each of said side walls includes a plurality of connecting members for connecting a first side wall of a first holder to a second side wall of a second holder to connect two holders together side by side.

8. A modular holder for a plurality of compact discs each of which is stored in an associated case comprising:

a bottom wall having a plurality of upstanding ribs spaced along a width of said bottom wall and defining a plurality of compact disc case holding areas, said bottom wall including in each of said compact disc holding areas a spring and a retaining member disposed opposite of said spring for opposing the force thereof to maintain a compact disc case between said spring and said retaining member when said retaining member is in a first position, said retaining member being movable to a second position for releasing a compact disc case to allow said spring to partially eject said case from said holder, wherein said retaining member is formed as an integral part of said bottom wall, said bottom wall including a plurality of apertures disposed along a first side thereof and a second opposite side thereof;

a first side wall having a plurality of downwardly extending projections insertable into respective apertures disposed along said first side of said bottom wall to mount said first side wall on said bottom wall and said first side wall having a plurality of upwardly extending projections;

a second side wall having a plurality of downwardly extending projections insertable into respective apertures disposed along said second side of said bottom wall to mount said second side wall on said bottom wall and said second side wall having a plurality of upwardly extending projections; and a top wall including a plurality of apertures disposed along a first side thereof and into which said upwardly extending projections of said first side wall are insertable to mount said top wall on said first side wall and said top wall including a plurality of apertures disposed along a second side thereof and into which said upwardly extending projections of said second side wall are insertable to mount said top wall on said second side wall.

9. A modular holder for a plurality of compact disc cases as recited in claim 8 wherein said first and second side walls have the same configuration so as to be interchangeable.

10. A modular holder for a plurality of compact disc cases as recited in claim 8 wherein said retaining member is formed as an integral part of said bottom wall.

11. A modular holder for a plurality of compact disc cases as recited in claim 8 wherein said spring is formed as an integral part of said bottom wall.

12. A modular holder for a plurality of compact disc cases as recited in claim 8 wherein said retaining member is formed as an integral part of said bottom wall of molded plastic and each of said springs is a metal spring mounted on said bottom wall.

13. A modular holder for a plurality of compact disc cases as recited in claim 8 wherein each of skid retaining members includes a cantilevered portion that is spaced from an adjacent rib so as to be movable with respect thereto and at an outer end of said cantilevered portion, each of said retaining members includes an actuator portion that is manually actuable to move said cantilevered portion downwardly, said actuator portion having an upstanding lip to engage a compact disc case when said retaining member is in said first position, said lip disengaging a compact disc case when said actuator portion is moved to said second position.

14. A modular holder for a plurality of compact disc cases as recited in claim 8 wherein a bottom wall of a first holder includes a plurality of connecting members mateable with a plurality of connecting members on a top wall of a second holder to allow the bottom wall of said first holder to be connected to the top wall of said second holder to mount said first holder on top of said second holder.

15. A modular holder for a plurality of compact disc cases as recited in claim 14 wherein each of said side walls includes a plurality of connecting members for connecting a first side wall of a first holder to a second side wall of a second holder to connect two holders together side by side.

16. A modular holder for a plurality of compact discs each of which is stored in an associated case comprising:

a bottom wall having a plurality of slots spaced along a width thereof to define between each pair of adjacent slots a cantilevered portion of said bottom wall and said bottom wall having a plurality of dividers spaced along the width thereof wherein a portion of each of said dividers extends above a respective slot, said dividers defining a plurality of compact disc case holding areas, each of said areas including one of said cantilevered portions of said bottom wall with a retaining member on an end of said cantilevered portion and each of said areas includes a spring disposed at an end of said compact disc case holding area opposite said retaining member for opposing the force thereof to maintain a compact disc case between said spring and said retaining member when said retaining member is in a first position, said retaining member being movable to a second position for releasing a compact disc case to allow said spring to partially eject said case from said holder, wherein said retaining member is formed as an integral part of said bottom wall;

a first side wall mountable on a first side of said bottom wall;

a second side wall mountable on a second side of said bottom wall opposite said first side; and a top wall mountable on said first and second side walls.

17. A modular holder for a plurality of compact disc cases as recited in claim 16 wherein each of said springs is an S-curved spring cantilevered from said bottom wall in a respective compact disc holding area.

18. A modular holder for a plurality of compact discs each of which is stored in an associated case comprising:

a bottom wall having a plurality of dividers extending upwardly therefrom, said dividers being spaced along a width of said bottom wall and defining a plurality of compact disc case holding areas, said bottom wall including in each of said compact disc case holding areas a spring and a retaining member disposed opposite of said spring for opposing the force thereof to maintain a compact disc case between said spring and said retaining member when said retaining member is in a first position, said retaining member being movable to a second position for releasing a compact disc case to allow said spring to partially eject said case from said holder, wherein said retaining member is formed as an integral part of said bottom wall;

a first side wall mounted on a first side of said bottom wall;

a second side wall mounted on a second side of said bottom wall opposite said first side; and a top wall mounted on said first and second side walls.

19. A modular holder for a plurality of compact disc cases as recited in claim 18 wherein each of said springs is an S-curved spring cantilevered from said bottom wall in a respective compact disc holding area.

* * * * *